United States Patent
Han et al.

(10) Patent No.: US 12,311,951 B2
(45) Date of Patent: May 27, 2025

(54) METHODS AND SYSTEMS FOR DETECTING WIND SPEED AND DIRECTION DURING DRIVING

(71) Applicant: TuSimple, Inc., San Diego, CA (US)

(72) Inventors: Xiaoling Han, San Diego, CA (US); Jianqiu Cao, San Diego, CA (US); Shuhan Yang, San Diego, CA (US); Yijing Li, San Diego, CA (US)

(73) Assignee: TUSIMPLE, INC., San Diego, CA (US)

( * ) Notice: Subject to any disclaimer, the term of this patent is extended or adjusted under 35 U.S.C. 154(b) by 195 days.

(21) Appl. No.: 18/066,541

(22) Filed: Dec. 15, 2022

(65) Prior Publication Data

US 2023/0219575 A1 Jul. 13, 2023

Related U.S. Application Data

(60) Provisional application No. 63/266,674, filed on Jan. 11, 2022.

(51) Int. Cl.
| | |
|---|---|
| *B60W 40/02* | (2006.01) |
| *B60W 30/02* | (2012.01) |
| *B60W 40/105* | (2012.01) |
| *B60W 40/114* | (2012.01) |

(52) U.S. Cl.
CPC ............ *B60W 40/02* (2013.01); *B60W 30/02* (2013.01); *B60W 40/105* (2013.01); *B60W 40/114* (2013.01); *B60W 2420/00* (2013.01); *B60W 2510/202* (2013.01); *B60W 2520/14* (2013.01); *B60W 2520/40* (2013.01)

(58) Field of Classification Search
CPC .......................... B60W 40/02; B60W 40/1005
See application file for complete search history.

(56) References Cited

U.S. PATENT DOCUMENTS

| | | | |
|---|---|---|---|
| 9,327,764 B2 | 5/2016 | Limpibunterng et al. | |
| 11,628,863 B1* | 4/2023 | Huang | B60W 60/0023 701/24 |
| 2020/0156468 A1* | 5/2020 | Takaue | B60W 50/0097 |

(Continued)

OTHER PUBLICATIONS

Sciencing, "Different Types of Anemometers" [ Apr. 2017 ] https://sciencing.com/different-types-anemometers-8526081.html (4 pages).

(Continued)

*Primary Examiner* — Long T Tran
(74) *Attorney, Agent, or Firm* — Perkins Coie LLP

(57) ABSTRACT

Disclosed are devices, systems and methods related to direct and indirect methods for detecting wind speed and direction during driving. An example method may include estimating, by a processor of a vehicle controller, a speed and a direction of wind movement near the vehicle based on a first sensor output from a wind sensor, or a second sensor output from a non-wind sensor, or a combination of the first sensor output and the second sensor output, wherein a primary purpose of the wind sensor is wind detection, and a primary purpose of the non-wind sensor is different from wind detection, and generating a control output indicative of a vehicle disturbance force resulting from the wind based on the estimated speed and direction of the wind movement.

17 Claims, 4 Drawing Sheets

(56) References Cited

U.S. PATENT DOCUMENTS

| | | | | |
|---|---|---|---|---|
| 2020/0276974 | A1* | 9/2020 | Tulpule | B60W 30/188 |
| 2020/0394907 | A1* | 12/2020 | Takamori | B60W 30/02 |
| 2021/0003670 | A1* | 1/2021 | Diehl | B60R 16/02 |
| 2021/0024069 | A1* | 1/2021 | Herman | B60W 60/00274 |
| 2021/0197837 | A1* | 7/2021 | Grubwinkler | G01P 5/00 |
| 2021/0291640 | A1* | 9/2021 | Srivastava | B60K 11/085 |
| 2022/0126867 | A1* | 4/2022 | Han | G01P 5/00 |
| 2022/0179096 | A1* | 6/2022 | Hoehenberger | B60W 10/20 |
| 2022/0266852 | A1* | 8/2022 | Khayyer | B60W 40/08 |
| 2023/0060112 | A1* | 2/2023 | Marumo | B60W 30/18172 |
| 2023/0066635 | A1* | 3/2023 | Chandrasekaran | B60W 30/146 |

OTHER PUBLICATIONS

Cooperative Institute for Research in Environmental Sciences at The University of Colorado Boulder, "Measuring Wind With Microphones" [ Feb. 2014 ] https://cires.colorado.edu/news/measuring-wind-microphones (7 pages).

Petr Stodola, Univzita Obrany, "Basic Motion Model of Autonomous Ground Vehicle" [ Oct. 2010 ] (6 pages).

Marc Sigonius, KTH Royal Institute of Technology School of Electrical Engineering and Computer Science, "Speed and Yaw Rate Estimation in Autonomous Vehicles Using Doppler Radar Measurements" Master Thesis at EECS, [ 2018 ] (73 pages).

\* cited by examiner

METHODS AND SYSTEMS FOR DETECTING WIND SPEED AND DIRECTION DURING DRIVING

CROSS-REFERENCE TO RELATED APPLICATIONS

This document claims priority to and benefits of U.S. Patent Application No. 63/266,674, filed on Jan. 11, 2022. The aforementioned application of which is incorporated by reference in its entirety.

TECHNICAL FIELD

This document generally relates to controlling vehicles, and in particular, methods and systems for detecting wind speed and direction during driving.

BACKGROUND

Autonomous vehicle navigation is a technology for sensing the position and movement of a vehicle and, based on the sensing, autonomously controlling the vehicle to navigate towards a destination. Autonomous vehicles have important applications in transportation of people, goods and services. A vehicle safety system that leverages redundancy to ensure continuous and robust autonomous operation is paramount for the safety of the vehicle, as well as people and property in the vicinity of the vehicle.

SUMMARY

Disclosed are devices, systems and methods related to direct and indirect methods for detecting wind speed and direction during driving.

In an aspect, the disclosed technology can be implemented to provide a method of wind estimation in a vehicle. The method may include estimating, by a processor of a vehicle controller, a speed and a direction of wind movement near the vehicle based on a first sensor output from a wind sensor, or a second sensor output from a non-wind sensor, or a combination of the first sensor output and the second sensor output, wherein a primary purpose of the wind sensor is wind detection, and a primary purpose of the non-wind sensor is different from wind detection, and generating a control output indicative of a vehicle disturbance force resulting from the wind based on the estimated speed and direction of the wind movement.

In another aspect, the disclosed technology can be implemented to provide a wind detection and estimation system in a vehicle. The system may include a vehicle motion model configured to generate estimated motion related values associated with the vehicle under certain wind conditions or no-wind conditions, a comparator in communication a sensor configured to generate a sensor output corresponding to an actual wind force applied to the vehicle or actual motion related values of the vehicle resulting from the actual wind force, the comparator configured to compare the estimated motion related values generated by the vehicle motion model with the actual motion related values corresponding to the sensor output to generate a wind detection estimation output, and a comprehensive wind control algorithm configured to generate a wind control output for adjusting a control amount of the vehicle based on the wind detection estimation output.

The above and other aspects and features of the disclosed technology are described in greater detail in the drawings, the description and the claims.

DETAILED DESCRIPTION

Figure 1:
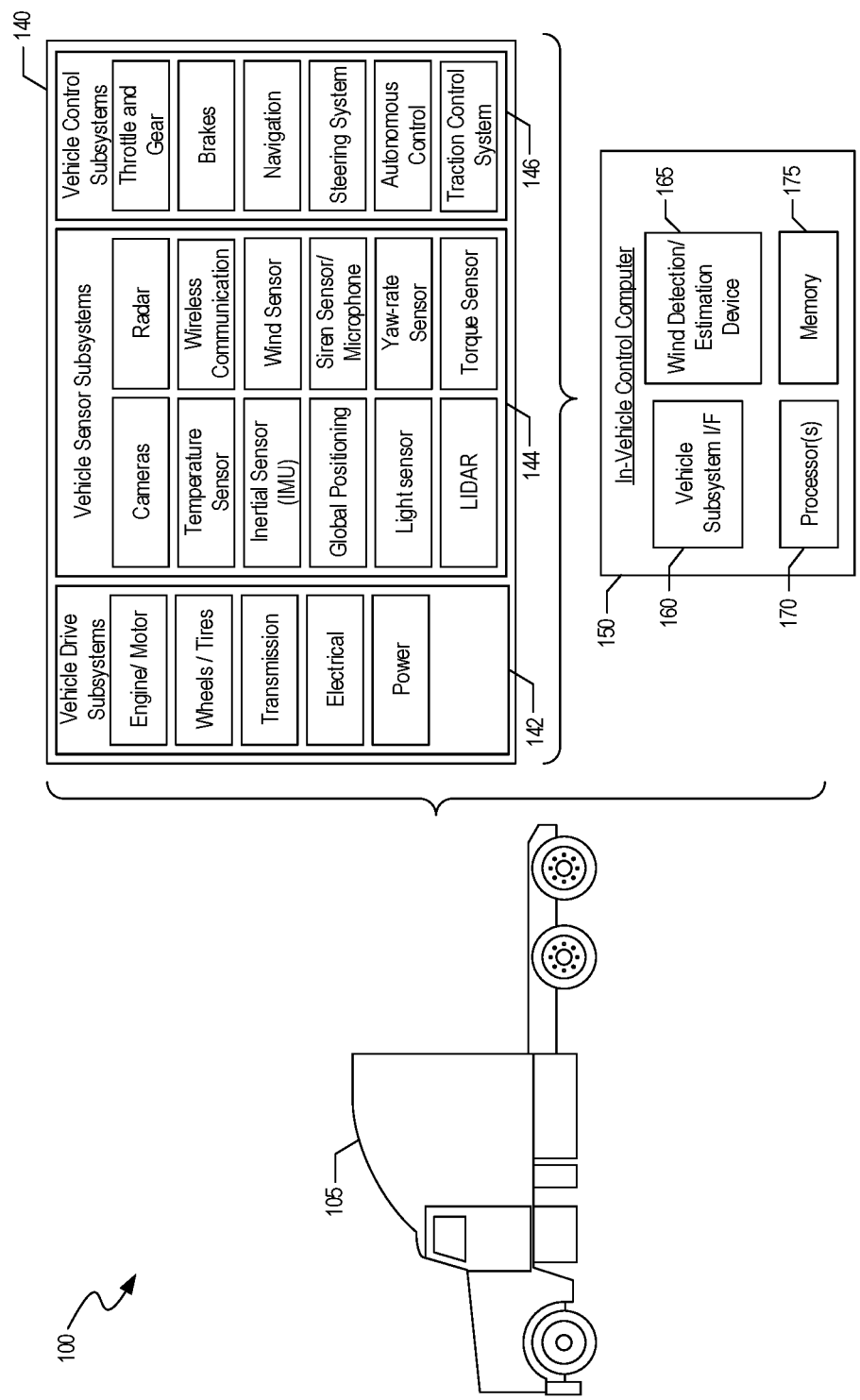
FIG. 1 shows a block diagram of an example vehicle ecosystem in which an in-vehicle control computer located in the vehicle comprises a wind estimation system.

The transportation industry has been undergoing considerable changes in the way technology is used to control the operation of the vehicles. As exemplified in the automotive passenger vehicle, there has been a general advancement towards shifting more of the operational and navigational decision making away from the human driving and into on-board computing power. This is exemplified in the extreme by the numerous autonomous vehicle designs currently under development. Current implementations are in intermediate stages, such as the partially-autonomous operation in some vehicles (e.g., autonomous acceleration and navigation, but with the requirement of a present and attentive driver), the safety-protecting operation of some vehicles (e.g., maintaining a safe following distance and automatic braking), the safety-protecting warnings of some vehicles (e.g., blind-spot indicators in side-view mirrors and proximity sensors), as well as ease-of-use operations (e.g., autonomous parallel parking).

Various weather conditions and external forces can influence the movement of a vehicle. For instance, headwinds, tailwinds, and crosswinds can influence the movement of a vehicle. The disclosed technology can be implemented in some embodiments to provide a wind detection/estimation device for detecting and estimating wind speed and direction. The estimate of wind movement surrounding an autonomous vehicle can be used to determine a more accurate steering angle and speed predictions than can be estimated without taking into consideration the wind shear effect.

In some implementations, the wind detection/estimation device can directly detect the wind speed and/or direction using physical wind sensors such as ultrasonic based omni-directional wind sensor and directional pressure-based wind sensors. Examples of the physical wind sensors can include a hot wire or thermal flow anemometer that measures both the wind speed and pressure, a windmill anemometer that measures both wind speed and direction, a pressure tube anemometer, an ultrasonic anemometer structured to send sonic pulses across a path to a sensor on the opposite side, and a laser Doppler anemometer that utilizes the Doppler effect to determine the flow of air. In some implementations, the wind sensors can be mounted on the tractor portion and/or the trailer portion of an autonomous truck.

In some implementations, the wind detection/estimation device can directly and/or indirectly detect the wind speed and/or direction using sound sensors that includes a microphone for detecting and/or amplifying the wind sound. In one example, the microphone in the siren sensor can be configured to detect siren sounds of emergency vehicles. In another example, the microphone in the siren sensor can be configured to receive audio indications of the presence of, or instructions from, authorities, including sirens. In some implementations, these microphones are mounted, or located, on the tractor portion and/or the trailer portion of an autonomous truck. In one example, the wind detection/estimation device can use siren sensors to detect the wind speed and direction. Such siren sensors can include a dedicated siren sensor for wind direction, or a general-purpose siren sensor that is shared by different functionalities. In some implementations, a plurality of microphones can be used to detect noise caused by wind flows and measure the wind speed and direction by comparing noise detected simultaneously by the plurality of microphones.

The disclosed technology can be implemented in some embodiments to provide a wind detection/estimation device that can estimate the wind speed and/or direction of a headwind or tailwind using indirect ways. In some implementations, the wind detection/estimation device can use a torque difference between the driving force under no-wind conditions and the actual driving force, e.g., during a highway cruising. In some implementations, the wind detection/estimation device can use a vehicle motion model to estimate the wind speed and/or direction during acceleration or deceleration. In some implementations, the wind detection/estimation device can use both the torque difference and the vehicle motion model to estimate the wind speed and/or direction. In some implementations, torque sensors are mounted, or located, on the tractor portion and/or the trailer portion of an autonomous truck.

In some implementations, the vehicle motion model is one that is used to compute vehicle position based on parameters of its motion system and derive values of these parameters according to current demands for movement of the vehicle from a current position to a new position. In one example, the vehicle motion model can be used to perform a trajectory prediction under certain wind conditions or no-wind conditions. In some implementations, the vehicle motion model provides an estimation of an approximated vehicle position via a mathematical model of its motion.

The disclosed technology can be implemented in some embodiments to provide a wind detection/estimation device that can estimate the wind speed and/or direction of a crosswind using indirect ways. In some implementations, the wind detection/estimation device can use the vehicle motion model and a yaw rate of the vehicle to detect an unintended vehicle motion caused by the wind. Here, the yaw rate refers to lateral movements of the vehicle in left or right directions resulting from moving the steering wheel of the vehicle. In one example, the wind detection/estimation device can compare an expected yaw rate, which is expected based on the vehicle motion model, to the actual yaw rate. In some implementations, the wind detection/estimation device can use a steering torque offset to calculate the potential wind speed and direction. In one example, the wind detection/estimation device can use a sensor input from a steering torque sensor configured to detect an unintended steering torque on the steering of the vehicle.

In some implementations, the wind detection/estimation device can also use the latest wind report from a weather service provider, along with the detection and/or the estimation discussed above.

In some implementations, the wind detection/estimation device can be used to determine a vehicle disturbance force resulting from headwind, tailwind, and crosswind at various points on the vehicle. The determined vehicle disturbance force can be used to control a vehicle control system for the vehicle. The direction and/or speed of winds such as headwinds, tailwinds, and crosswinds can be directly measured using wind sensors. In some embodiments of the disclosed technology, the direction and/or speed of winds can be estimated using a set of inputs from sensors other than the wind sensors.

In some implementations, the wind detection/estimation device can directly detect the wind speed and direction using, e.g., wind sensors and/or estimate the wind speed and direction using indirect methods. In some implementations, the indirect methods can use a vehicle motion model to obtain an estimated direction and/or speed of winds. In one example, the estimated direction and/or speed of winds can be obtained by comparing a theoretical driving force and torque that can be produced by the engine and steering to an actual driving force and torque of the vehicle. In another example, the estimated direction and/or speed of winds can be obtained by comparing a theoretical steering torque or a theoretical yaw rate to an actual steering torque or an actual yaw rate.

FIG. 1 shows a block diagram of an example vehicle ecosystem 100 in which an in-vehicle control computer 150 located in the autonomous vehicle 105 includes a synchronization unit that synchronizes multiple heterogeneous sensors. As shown in FIG. 1, the autonomous vehicle 105 may be a semi-trailer truck. The vehicle ecosystem 100 includes several systems and components that can generate and/or deliver one or more sources of information/data and related services to the in-vehicle control computer 150 that may be located in an autonomous vehicle 105. The in-vehicle control computer 150 can be in data communication with a plurality of vehicle subsystems 140, all of which can be resident in the autonomous vehicle 105. The in-vehicle control computer 150 and the plurality of vehicle subsystems 140 can be referred to as autonomous driving system (ADS). A vehicle subsystem interface 160 is provided to facilitate data communication between the in-vehicle control computer 150 and the plurality of vehicle subsystems 140. In some embodiments, the vehicle subsystem interface 160 can include a controller area network controller to communicate with devices in the vehicle subsystems 140.

The autonomous vehicle 105 may include various vehicle subsystems that support of the operation of autonomous vehicle 105. The vehicle subsystems may include a vehicle drive subsystem 142, a vehicle sensor subsystem 144, and/or a vehicle control subsystem 146. The components or devices of the vehicle drive subsystem 142, the vehicle sensor subsystem 144, and the vehicle control subsystem 146 as shown as examples. In some embodiment, additional components or devices can be added to the various subsystems or one or more components or devices can be removed. The vehicle drive subsystem 142 may include components operable to provide powered motion for the autonomous vehicle 105. In an example embodiment, the vehicle drive subsystem 142 may include an engine or motor, wheels/tires, a transmission, an electrical subsystem, and a power source.

The vehicle sensor subsystem 144 may include a number of sensors configured to sense information about an environment in which the autonomous vehicle 105 is operating or a condition of the autonomous vehicle 105. The vehicle sensor subsystem 144 may include one or more cameras or image capture devices, one or more temperature sensors, an inertial measurement unit (IMU), a localization system such as a Global Positioning System (GPS), a laser range finder/

LiDAR unit, a RADAR unit, an ultrasonic sensor, and/or a wireless communication unit (e.g., a cellular communication transceiver). The vehicle sensor subsystem 144 may also include sensors configured to monitor internal systems of the autonomous vehicle 105 (e.g., an O2 monitor, a fuel gauge, an engine oil temperature, etc.,). In some embodiments, the vehicle sensor subsystem 144 may include one or more wind sensors such as ultrasonic based omni-directional wind sensor and directional pressure-based wind sensors to detect the wind speed and/or direction. In some embodiments, the vehicle sensor subsystem 144 may include a siren sensor configured to detect siren sounds as discussed above. In one example, the microphone can be mounted on the tractor portion and/or the trailer portion of an autonomous truck. In some embodiments, the vehicle sensor subsystem 144 may include a yaw-rate sensor configured to detect a yaw rate of the vehicle. In some embodiments, the vehicle sensor subsystem 144 may include a torque sensor configured to detect a torque applied to the vehicle.

The IMU may include any combination of sensors (e.g., accelerometers and gyroscopes) configured to sense position and orientation changes of the autonomous vehicle 105 based on inertial acceleration. The localization system may be any sensor configured to estimate a geographic location of the autonomous vehicle 105. For this purpose, the localization system may include a receiver/transmitter operable to provide information regarding the position of the autonomous vehicle 105 with respect to the Earth. The RADAR unit may represent a system that utilizes radio signals to sense objects within the environment in which the autonomous vehicle 105 is operating. In some embodiments, in addition to sensing the objects, the RADAR unit may additionally be configured to sense the speed and the heading of the objects proximate to the autonomous vehicle 105. The laser range finder or LiDAR unit may be any sensor configured to sense objects in the environment in which the autonomous vehicle 105 is located using lasers. The LiDAR unit may be a spinning LiDAR unit or a solid-state LiDAR unit. The cameras may include one or more cameras configured to capture a plurality of images of the environment of the autonomous vehicle 105. The cameras may be still image cameras or motion video cameras.

The vehicle control subsystem 146 may be configured to control operation of the autonomous vehicle 105 and its components. Accordingly, the vehicle control subsystem 146 may include various elements such as a throttle and gear, a brake unit, a navigation unit, a steering system and/or an autonomous control unit. The throttle may be configured to control, for instance, the operating speed of the engine and, in turn, control the speed of the autonomous vehicle 105. The gear may be configured to control the gear selection of the transmission. The brake unit can include any combination of mechanisms configured to decelerate the autonomous vehicle 105. The brake unit can use friction to slow the wheels in a standard manner. The brake unit may include an anti-lock brake system (ABS) that can prevent the brakes from locking up when the brakes are applied. The navigation unit may be any system configured to determine a driving path or route for the autonomous vehicle 105. The navigation unit may additionally be configured to update the driving path dynamically while the autonomous vehicle 105 is in operation. In some embodiments, the navigation unit may be configured to incorporate data from the localization system and one or more predetermined maps so as to determine the driving path for the autonomous vehicle 105. The steering system may represent any combination of mechanisms that may be operable to adjust the heading of autonomous vehicle 105 in an autonomous mode or in a driver-controlled mode.

The autonomous control unit may represent a control system configured to identify, evaluate, and avoid or otherwise negotiate potential obstacles in the environment of the autonomous vehicle 105. In general, the autonomous control unit may be configured to control the autonomous vehicle 105 for operation without a driver or to provide driver assistance in controlling the autonomous vehicle 105. In some embodiments, the autonomous control unit may be configured to incorporate data from the localization system, the RADAR, the LiDAR, the cameras, and/or other vehicle subsystems to determine the driving path or trajectory for the autonomous vehicle 105.

The traction control system (TCS) may represent a control system configured to prevent the autonomous vehicle 105 from swerving or losing control while on the road. For example, TCS may obtain signals from the IMU and the engine torque value to determine whether it should intervene and send instruction to one or more brakes on the autonomous vehicle 105 to mitigate the autonomous vehicle 105 swerving. TCS is an active vehicle safety feature designed to help vehicles make effective use of traction available on the road, for example, when accelerating on low-friction road surfaces. When a vehicle without TCS attempts to accelerate on a slippery surface like ice, snow, or loose gravel, the wheels can slip and can cause a dangerous driving situation. TCS may also be referred to as electronic stability control (ESC) system.

Many or all of the functions of the autonomous vehicle 105 can be controlled by the in-vehicle control computer 150. The in-vehicle control computer 150 may include at least one processor 170 (which can include at least one microprocessor) that executes processing instructions stored in a non-transitory computer readable medium, such as the memory 175. The in-vehicle control computer 150 may also represent a plurality of computing devices that may serve to control individual components or subsystems of the autonomous vehicle 105 in a distributed fashion. In some embodiments, the memory 175 may contain processing instructions (e.g., program logic) executable by the processor 170 to perform various methods and/or functions of the autonomous vehicle 105, including those described for the detection/estimation device 165 as explained in this patent document. For instance, the processor 170 executes the operations associated with the detection/estimation device 165 for ensuring safe operation of the autonomous vehicle, which includes switching from a default operating mode to a minimal risk condition (MRC) mode. The operations of the detection/estimation device 165 are further described in this patent document.

The memory 175 may contain additional instructions as well, including instructions to transmit data to, receive data from, interact with, or control one or more of the vehicle drive subsystem 142, the vehicle sensor subsystem 144, and the vehicle control subsystem 146. The in-vehicle control computer 150 may control the function of the autonomous vehicle 105 based on inputs received from various vehicle subsystems (e.g., the vehicle drive subsystem 142, the vehicle sensor subsystem 144, and the vehicle control subsystem 146).

An autonomous driving system can include an artificial intelligence (AI) system. Autonomous vehicles (AV) are equipped with multiple sensors, such as cameras, radars and lidar, which help them better understand the surroundings and in path planning. These sensors generate a massive amount of data, and the AI system processes the data and train its autonomous driving systems. In some implementations, the vehicle motion model configured to estimate the wind speed and/or direction as discussed above may include such an AI system such as a trained neural network.

In some implementations of the disclosed technology, in a case that hardware and/or software failures occur in situations when the vehicle is in motion, a backup fail-safe system may take the control of the vehicle and maintain it in a safety mode. In one example, the VSS may include the backup fail-safe system discussed below.

Figure 2:
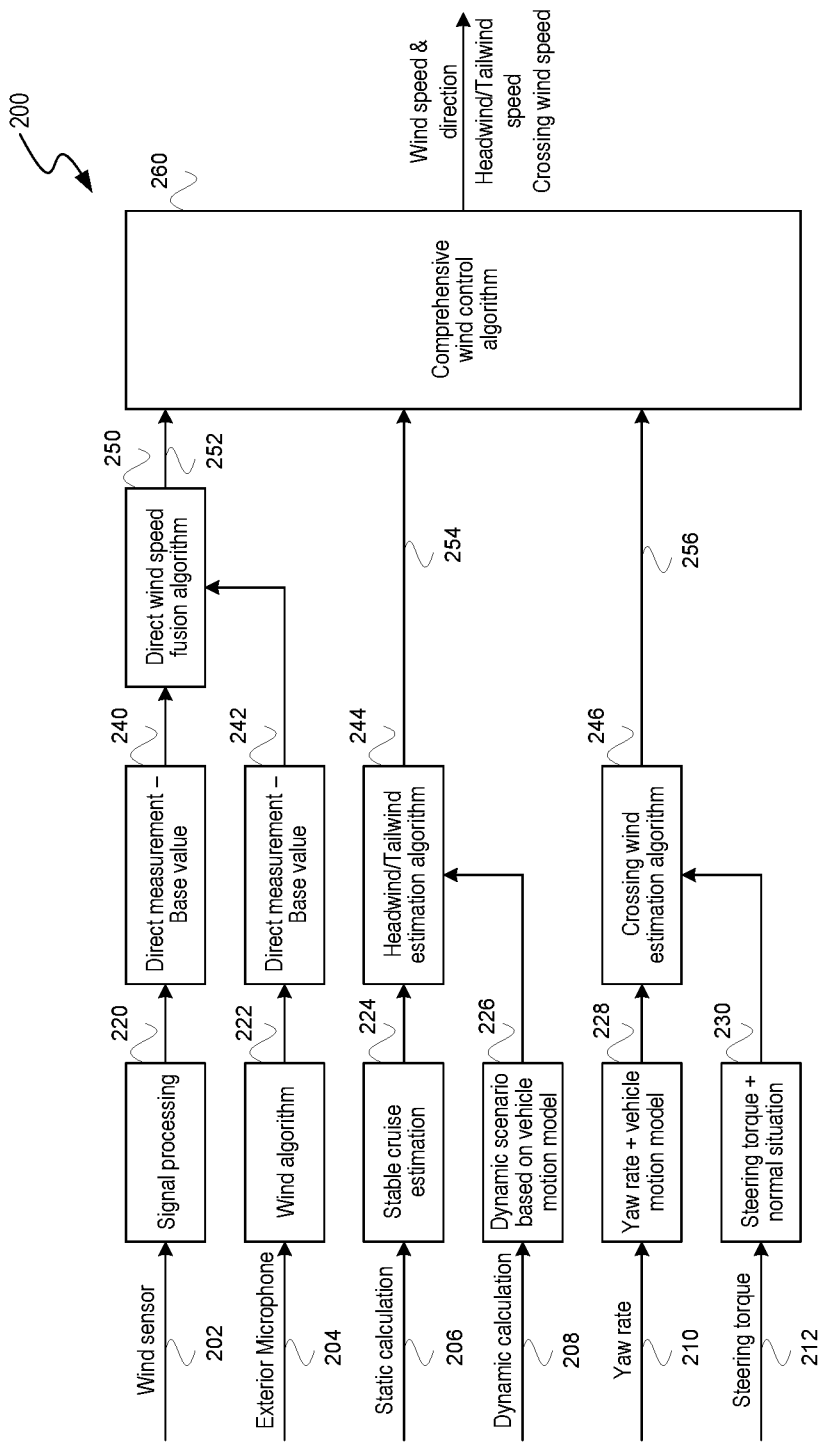
FIG. 2 shows a block diagram of an example of a comprehensive wind level and direction detection system implemented based on some embodiments of the disclosed technology.

FIG. 2 shows a block diagram of an example of a comprehensive wind level and direction detection system implemented based on some embodiments of the disclosed technology.

Referring to FIG. 2, the comprehensive wind level and direction detection system 200 may include a signal processing module 220, a wind algorithm module 222, a stable cruise estimation module 224, a dynamic scenario determination module 226, a yaw rate determination module 228, and a steering torque determination module 230.

In some implementations, the signal processing module 220 is configured to receive an input 202 from a wind sensor to generate a first direct measurement base value 240. In some implementations, the wind algorithm module 222 is configured to receive an input 204 from an exterior microphone to generate a second direct measurement base value 242 based on the input 204. In one example, the wind algorithm module 222 receives noise values detected simultaneously by exterior microphones and compare them to generate the second direct measurement base value 242. The first direct measurement base value 240, or the second direct measurement base value 242, or a combination of the first direct measurement base value 240 and the second direct measurement base value 242 are fed to a direct wind speed fusion algorithm module 250 to determine the wind speed and direction.

In some implementations, the stable cruise estimation module 224 is configured to receive a static calculation input 206 associated with a highway cruise control to feed an output to a headwind/tailwind estimation algorithm 244. In some implementations, the dynamic scenario determination module 226 is configured to receive a dynamic calculation input 208 associated with a dynamic scenario to feed an output to the headwind/tailwind estimation algorithm 244. In one example, the headwind/tailwind estimation algorithm 244 is configured to estimate the speed of a headwind or tailwind using indirect ways. In some implementations, the headwind/tailwind estimation algorithm 244 can use a torque difference between the driving force under no-wind conditions and the real driving force, e.g., during a highway cruising. In some implementations, the headwind/tailwind estimation algorithm 244 can use a vehicle motion model to estimate the wind speed and/or direction during acceleration or deceleration. In some implementations, the wind detection/estimation device can use both the torque difference and the vehicle motion model to estimate the wind speed and/or direction.

In some implementations, the static calculation input 206 and the dynamic calculation input 208 can include engine torque and braking force. In one example, the dynamic calculation input 208 includes acceleration/deceleration speed, the vehicle weight, and/or road condition including friction and grade, each of which can be an important part in the estimation.

In some implementations, the yaw rate determination module 228 is configured to receive an input 210 associated with the yaw rate of the vehicle to feed an output to a crossing wind estimation algorithm module 246. In one example, the yaw rate determination module 228 is configured to use the vehicle motion model and a yaw rate of the vehicle to detect an unintended vehicle motion caused by the wind. In one example, the yaw rate determination module 228 can compare an expected yaw rate, which is expected based on the vehicle motion model, to the actual yaw rate.

In some implementations, the steering torque determination module 230 is configured to receive an input 212 associated with the steering torque of the vehicle to feed an output to the crossing wind estimation algorithm module 246. In one example, the steering torque determination module 230 can use a steering torque offset to calculate the potential wind speed and direction. In one example, the steering torque determination module 230 can generate an output for indicating the steering torque offset by comparing an actual steering torque with a reference steering torque corresponding to a normal situation.

In some implementations, the direct wind speed fusion algorithm module 250 is configured to feed an output 252 to a comprehensive wind control algorithm module 260 as a direct detection of the speed and/or direction of the wind. In some implementations, the headwind/tailwind estimation algorithm 244 is configured to feed an output 254 to the comprehensive wind control algorithm module 260 as an indirect detection or estimation of the speed and/or direction of the headwind and/or the tailwind. In some implementations, the crossing wind estimation algorithm module 246 is configured to feed an output 256 to the comprehensive wind control algorithm module 260 as an indirect detection or estimation of the crossing wind. The comprehensive wind control algorithm module 260 can determine the wind speed and direction, the headwind speed or the tailwind speed and the crossing wind speed based on the outputs 252, 254, 256 from the direct wind speed fusion algorithm module 250, the headwind/tailwind estimation algorithm 244, and the crossing wind estimation algorithm module 246.

Figure 3:
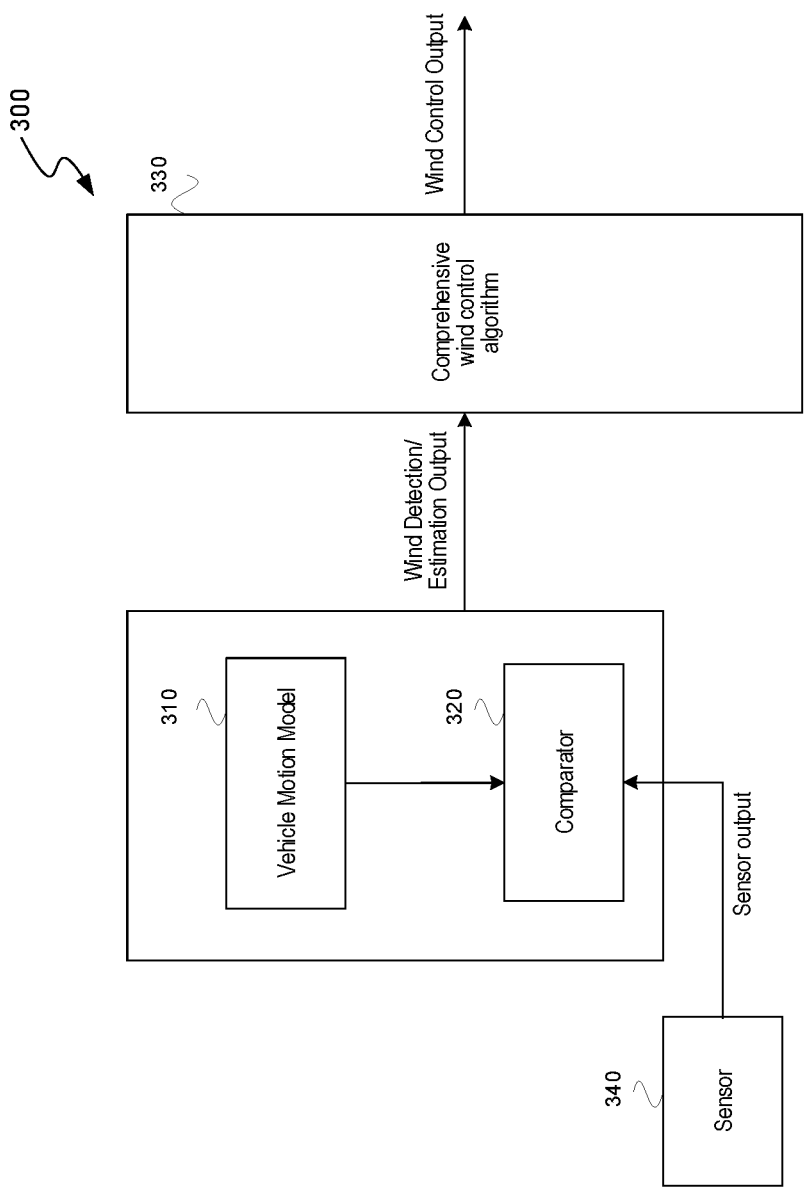
FIG. 3 shows a flowchart of an example method for controlling operation of an autonomous vehicle.

FIG. 3 shows an example of a wind detection estimation system 300 based on some embodiments of the disclosed technology.

In some implementations, the wind detection estimation system 300 may include a vehicle motion model 310, a comparator 320, and a comprehensive wind control algorithm 330.

In one example, the vehicle motion model 310 generates an expected speed, steering, torque, yaw rate or other motion related values that can have an impact on the trajectory of the vehicle. The comparator 320 can be used to compare the expected speed, steering, torque, yaw rate or other motion related values to an actual speed, steering, torque, yaw rate or other motion related values received from a sensor 340 to estimate the wind speed and/or direction of headwinds, tailwinds, and/or crosswinds. The estimated wind speed and/or direction of headwinds, tailwinds, and/or crosswinds are provided to the comprehensive wind control algorithm 330 to generate a wind control output.

In some implementations, the sensor 340 includes at least one of: a wind sensor configured to indicate a speed and direction of the wind; a siren sensor configured to detect an ambient siren sound; or a microphone configured to detect noise caused by the wind, wherein the noise detected by the one or more microphones is converted to indicate a speed of the wind. In one example, the wind detection estimation system 300 may further include a signal processing module configured to receive an input from the wind sensor to generate a first direct measurement base value based on the input. In another example, the wind detection estimation system 300 may further include a wind algorithm module configured to receive an input from the siren sensor or the microphone to generate a second direct measurement base value based on the input. In another example, the wind detection estimation system 300 may further include a signal processing module configured to receive a first input from the wind sensor to generate a first direct measurement base value based on the input, a wind algorithm module configured to receive a second input from the siren sensor or the microphone to generate a second direct measurement base value based on the input, and a direct wind speed fusion algorithm module configured to receive the first and second first direct measurement base values to determine the speed of the wind.

In some implementations, the wind detection estimation system 300 may further include a highway cruise estimation module configured to receive a static calculation input associated with a highway cruise control to generate an output to indicate at least one of headwind or tailwind that influences a trajectory of the vehicle.

In some implementations, the wind detection estimation system 300 may further include a dynamic scenario determination module configured to receive a dynamic calculation input associated with a dynamic scenario to generate an output estimated based on the vehicle motion model to indicate at least one of headwind or tailwind that influences a trajectory of the vehicle.

In some implementations, the wind detection estimation system 300 may further include a highway cruise estimation module configured to receive a static calculation input associated with a highway cruise control to generate a first output, a dynamic scenario determination module configured to receive a dynamic calculation input associated with a dynamic scenario to generate a second output, and a headwind and tailwind estimation module configured to estimate at least one of headwind or tailwind that influences a trajectory of the vehicle.

In some implementations, the sensor 340 includes a yaw-rate sensor configured to detect an actual yaw rate, and wherein the vehicle motion model generates an expected yaw rate, and wherein the actual yaw rate is compared to the expected yaw rate to determine an unintended lateral vehicle motion caused by the wind; a torque sensor configured to detect a torque applied to the vehicle, wherein the vehicle motion model generates a torque difference between a driving force under no-wind conditions and an actual driving force under windy conditions; or a steering torque sensor configured to detect a steering torque to determine an unintended steering torque on the vehicle.

In some implementations, the wind detection estimation system 300 may further include a yaw rate determination module configured to receive an input from the yaw-rate sensor to compare an expected yaw rate expected based on the vehicle motion model with an actual yaw rate generated by the yaw-rate sensor.

In some implementations, the wind detection estimation system 300 may further include a steering torque determination module configured to receive an input associated with the steering torque of the vehicle to generate a steering torque offset.

In some implementations, the wind detection estimation system 300 may further include a yaw rate determination module configured to receive a first input from the yaw-rate sensor to generate a first output by comparing an expected yaw rate expected based on the vehicle motion model with an actual yaw rate generated by the yaw-rate sensor, a steering torque determination module configured to receive a second input associated with the steering torque of the vehicle to generate a second output for indicating a steering torque offset by comparing an actual steering torque with a reference steering torque corresponding to a normal situation, and a crossing wind estimation algorithm module configured to estimate a crossing wind that influences a trajectory of the vehicle based on the first output and the second output.

Figure 4:
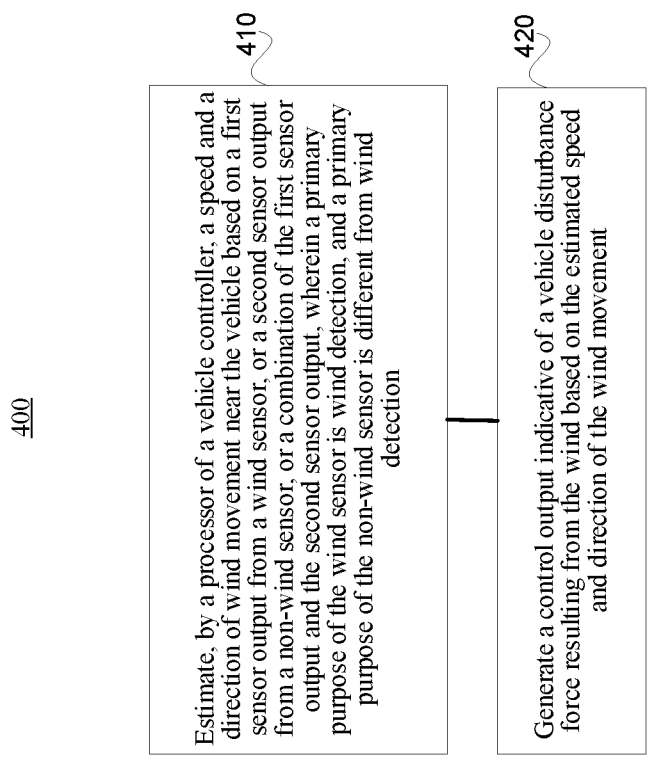
FIG. 4 shows an example of a hardware platform that can implement some methods and techniques described in the present document.

FIG. 4 shows a flowchart of an example method 400 for controlling operation of an autonomous vehicle. The method 400 includes, at 410, estimating, by a processor of a vehicle controller, a speed and a direction of wind movement near the vehicle based on a first sensor output from a wind sensor, or a second sensor output from a non-wind sensor, or a combination of the first sensor output and the second sensor output, wherein a primary purpose of the wind sensor is wind detection, and a primary purpose of the non-wind sensor is different from wind detection, and at 420, generating a control output indicative of a vehicle disturbance force resulting from the wind based on the estimated speed and direction of the wind movement.

In some implementations, the wind sensor includes at least one of an ultrasonic based omni-directional wind sensor or a directional pressure-based wind sensor configured to indicate a speed and direction of the wind.

In some implementations, the siren sensor includes one or more microphones configured to detect noise caused by the wind, and wherein the noise detected by the one or more microphones is converted to indicate a speed of the wind.

In some implementations, the estimating of the speed and direction of the wind includes using a vehicle motion model to perform a trajectory prediction under certain wind conditions or no-wind conditions.

In some implementations, the non-wind sensor includes a yaw-rate sensor configured to detect an actual yaw rate, and wherein the vehicle motion model generates an expected yaw rate, and wherein the actual yaw rate is compared to the expected yaw rate to determine an unintended lateral vehicle motion caused by the wind.

In some implementations, wherein the non-wind sensor includes a torque sensor configured to detect a torque applied to the vehicle, and wherein the vehicle motion model generates a torque difference between a driving force under no-wind conditions and an actual driving force under windy conditions.

In some implementations, wherein the non-wind sensor includes a steering torque sensor configured to detect a steering torque offset to determine an unintended steering torque on the vehicle.

It will be appreciated that the present document discloses various techniques useful for implementation in an autonomous vehicle and for estimating wind direction and wind speed in the vicinity of the vehicle. In some embodiments, this information may be used for navigating the vehicle in a precise manner by counter-balancing the force experienced due to wind. In some implementations, the wind speed and wind direction may be used to determine whether the wind conditions are unsafe for driving and whether the vehicle should undertake safety maneuvers such as stopping the vehicle, pulling into a middle lane or slowing down speed and turning on emergency light blinkers.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, e.g., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method of wind estimation in a vehicle, comprising:
   estimating, by a processor of a vehicle controller, a speed and a direction of wind movement near the vehicle based on a first sensor output from a wind sensor, or a second sensor output from a non-wind sensor, or a combination of the first sensor output and the second sensor output, wherein a primary purpose of the wind sensor is wind detection, and a primary purpose of the non-wind sensor is different from wind detection; and
   generating a control output indicative of a vehicle disturbance force resulting from the wind based on the estimated speed and direction of the wind movement;
   wherein the estimating of the speed and direction of the wind includes using a vehicle motion model to perform a trajectory prediction under certain wind conditions or no-wind conditions;
   wherein the non-wind sensor includes a yaw-rate sensor configured to detect an actual yaw rate, and wherein the vehicle motion model generates an expected yaw rate, and wherein the actual yaw rate is compared to the expected yaw rate to determine an unintended lateral vehicle motion caused by the wind.

2. The method of claim 1, wherein the wind sensor includes at least one of an ultrasonic based omni-directional wind sensor or a directional pressure-based wind sensor configured to indicate a speed and direction of the wind.

3. The method of claim 1, wherein the non-wind sensor includes a siren sensor configured to detect an ambient siren sound, and wherein the second sensor output of the siren sensor is converted to indicate a speed of the wind.

4. The method of claim 3, wherein the siren sensor includes one or more microphones configured to detect noise caused by the wind, and wherein the noise detected by the one or more microphones is converted to indicate a speed of the wind.

5. The method of claim 1, wherein the non-wind sensor includes a torque sensor configured to detect a torque applied to the vehicle, and wherein the vehicle motion model generates a torque difference between a driving force under no-wind conditions and an actual driving force under windy conditions.

6. The method of claim 1, wherein the non-wind sensor includes a steering torque sensor configured to detect a steering torque offset to determine an unintended steering torque on the vehicle.

7. A wind detection and estimation system in a vehicle, comprising:
- a vehicle motion model configured to generate estimated motion related values associated with the vehicle under certain wind conditions or no-wind conditions;
- a comparator in communication a sensor configured to generate a sensor output corresponding to an actual wind force applied to the vehicle or actual motion related values of the vehicle resulting from the actual wind force, the comparator configured to compare the estimated motion related values generated by the vehicle motion model with the actual motion related values corresponding to the sensor output to generate a wind detection estimation output;
- a comprehensive wind control algorithm configured to generate a wind control output for adjusting a control amount of the vehicle based on the wind detection estimation output;
- a highway cruise estimation module configured to receive a static calculation input associated with a highway cruise control to generate a first output;
- a dynamic scenario determination module configured to receive a dynamic calculation input associated with a dynamic scenario to generate a second output; and
- a headwind and tailwind estimation module configured to estimate at least one of headwind or tailwind that influences a trajectory of the vehicle.

8. The system of claim 7, wherein the sensor includes at least one of: a wind sensor configured to indicate a speed and direction of the wind; a siren sensor configured to detect an ambient siren sound; or a microphone configured to detect noise caused by the wind, wherein the noise detected by one or more microphones is converted to indicate a speed of the wind.

9. The system of claim 8, further comprising a signal processing module configured to receive an input from the wind sensor to generate a first direct measurement base value based on the input.

10. The system of claim 8, further comprising a wind algorithm module configured to receive an input from the siren sensor or the microphone to generate a second direct measurement base value based on the input.

11. The system of claim 8, further comprising:
- a signal processing module configured to receive a first input from the wind sensor to generate a first direct measurement base value based on the input;
- a wind algorithm module configured to receive a second input from the siren sensor or the microphone to generate a second direct measurement base value based on the input; and
- a direct wind speed fusion algorithm module configured to receive the first and second first direct measurement base values to determine the speed of the wind.

12. The system of claim 7, further comprising a highway cruise estimation module configured to receive a static calculation input associated with a highway cruise control to generate an output to indicate at least one of headwind or tailwind that influences a trajectory of the vehicle.

13. The system of claim 7, further comprising a dynamic scenario determination module configured to receive a dynamic calculation input associated with a dynamic scenario to generate an output estimated based on the vehicle motion model to indicate at least one of headwind or tailwind that influences a trajectory of the vehicle.

14. The system of claim 7, wherein the sensor includes a yaw-rate sensor configured to detect an actual yaw rate, and wherein the vehicle motion model generates an expected yaw rate, and wherein the actual yaw rate is compared to the expected yaw rate to determine an unintended lateral vehicle motion caused by the wind; a torque sensor configured to detect a torque applied to the vehicle, wherein the vehicle motion model generates a torque difference between a driving force under no-wind conditions and an actual driving force under windy conditions; or a steering torque sensor configured to detect a steering torque to determine an unintended steering torque on the vehicle.

15. The system of claim 14, further comprising a yaw rate determination module configured to receive an input from the yaw-rate sensor to compare an expected yaw rate expected based on the vehicle motion model with an actual yaw rate generated by the yaw-rate sensor.

16. The system of claim 14, further comprising a steering torque determination module configured to receive an input associated with the steering torque of the vehicle to generate a steering torque offset.

17. The system of claim 14, further comprising:
- a yaw rate determination module configured to receive a first input from the yaw-rate sensor to generate a first output by comparing an expected yaw rate expected based on the vehicle motion model with an actual yaw rate generated by the yaw-rate sensor;
- a steering torque determination module configured to receive a second input associated with the steering torque of the vehicle to generate a second output for indicating a steering torque offset by comparing an actual steering torque with a reference steering torque corresponding to a normal situation; and
- a crossing wind estimation algorithm module configured to estimate a crossing wind that influences a trajectory of the vehicle based on the first output and the second output.

* * * * *